(12) United States Patent
Martin et al.

(10) Patent No.: US 7,306,833 B2
(45) Date of Patent: Dec. 11, 2007

(54) STRUCTURE FOR THERMOCHROMIC GLAZING HAVING A SUBSTANCE CONTAINED BETWEEN TWO GLASS SUBSTRATES

(75) Inventors: Dorothee Martin, Suresnes (FR); Frank Marandon, Paris (FR); Yves Lehmann, Liernu (BE); Jean-Louis Bonnet, Wanfercee-Baulet (BE); Rino Messere, Modave (BE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/433,902

(22) PCT Filed: Jan. 23, 2002

(86) PCT No.: PCT/FR02/00277

§ 371 (c)(1),
(2), (4) Date: Dec. 5, 2003

(87) PCT Pub. No.: WO02/064937

PCT Pub. Date: Aug. 22, 2002

(65) Prior Publication Data

US 2004/0081775 A1    Apr. 29, 2004

(30) Foreign Application Priority Data

Jan. 24, 2001   (FR) .................................. 01 00912

(51) Int. Cl.
*E06B 3/00* (2006.01)
*E04C 2/54* (2006.01)
*G02F 1/15* (2006.01)
*G09G 3/19* (2006.01)

(52) U.S. Cl. ..................... 428/34; 52/786.13; 359/265; 345/49

(58) Field of Classification Search ................... 428/34, 428/192, 913, 65; 52/786.13; 359/265, 359/272, 275; 345/49
See application file for complete search history.

(56) References Cited

U.S. PATENT DOCUMENTS

| | | | | |
|---|---|---|---|---|
| 3,742,600 | A * | 7/1973 | Lowell | 29/592.1 |
| 4,362,771 | A * | 12/1982 | Umeda et al. | 428/1.6 |
| 4,741,603 | A * | 5/1988 | Miyagi et al. | 359/270 |
| 4,944,125 | A * | 7/1990 | Ito | 52/171.3 |
| 5,124,185 | A * | 6/1992 | Kerr et al. | 428/34 |
| 5,608,995 | A * | 3/1997 | Borden | 52/171.3 |
| 5,698,277 | A * | 12/1997 | Schueller et al. | 428/34 |
| 5,940,201 | A * | 8/1999 | Ash et al. | 359/267 |
| 6,111,684 | A * | 8/2000 | Forgette et al. | 359/267 |
| 6,444,281 | B1 * | 9/2002 | Wang et al. | 428/34 |

FOREIGN PATENT DOCUMENTS

| | | | |
|---|---|---|---|
| DE | 4127130 | | 2/1993 |
| GB | 1537626 | * | 1/1979 |
| JP | 9222618 | | 8/1997 |
| WO | WO00/34614 | | 6/2000 |
| WO | WO99/56302 | | 12/2002 |

* cited by examiner

*Primary Examiner*—Donald J. Loney
(74) *Attorney, Agent, or Firm*—Oblon, Spivak, McClelland, Maier & Neustadt, P.C.

(57) ABSTRACT

Structure comprising at least two glass substrates (10, 11) separated by a distance (i), at least one substance (12) at least partly filling the space between the two substrates, and spacers (13) placed between the two substrates in order to maintain their spacing, characterized in that the spacers (13) are fastened to at least one of the substrates.

26 Claims, 1 Drawing Sheet

STRUCTURE FOR THERMOCHROMIC GLAZING HAVING A SUBSTANCE CONTAINED BETWEEN TWO GLASS SUBSTRATES

FIELD OF THE INVENTION

The invention relates to a structure comprising at least two glass substrates separated by a distance i, at least one substance, especially a polymeric solution, at least partially filling the space between the two substrates, and spacers placed between the two substrates in order to maintain their separation. A polymeric, inorganic or metallic peripheral seal ensures that the two substrates are mechanically held together and sealed around the periphery.

Although the invention is not limited to such an application, it will be more particularly described in relation to the production of thermochromic glazing generally used for roofs or walls of porches or verandas. The polymeric solution contained in a thermochromic glazing unit is known to be a hydrogel which becomes opaque above a certain temperature and therefore blocks the transmission of visible light and infrared through the glazing.

BACKGROUND OF THE INVENTION

The fact of placing the glazing in a vertical position inevitably causes the solution to flow downward under gravity, thereby causing deformation in the glazing. The glass sheets thus tend to come together in the upper part of the glazing while they become domed in its lower part, generating stresses which may cause the glazing to burst.

It therefore proves to be preferable for the distance separating the glass sheets to be kept constant in such vertically positioned glazing.

Japanese patent application JP 09 222 618 discloses a glazing unit which includes a polymeric solution. The separation of the vertically positioned glazing is kept constant by establishing, within the glazing, a negative pressure state with respect to the outside, in particular by including between the two glass sheets spacers which are randomly distributed over the surface of the polymeric solution during manufacture, without being fixed thereto.

However, over time the spacers, which are free in the solution, tend to drop down toward the lower part of the glazing. They therefore no longer fulfill their function in the upper part of the glazing, causing the problem of hydrostatic depression mentioned above.

SUMMARY OF THE INVENTION

The object of the invention is to solve this deformation problem in such a glazing structure, particularly when it is positioned vertically.

Thus, according to the invention, the spacers are fastened to at least one of the substrates in order to prevent them from falling when the structure is positioned vertically.

According to one feature, the spacers constitute elements which are attached to the structure and fastened by adhesive bonding to at least one of the substrates by means of an organic or inorganic adhesive, for example an enamel.

The spacers are, for example, balls or other volumes, made of steel or of another material chemically compatible with the substance. Preferably, they are instead made of glass in order to ensure better optical quality of the glazing. They are, for example, glass balls, cylinders or parallelepipeds, or else other shapes, for example glass spacers such as those described in patent application WO 99/56302.

It may be useful for the spacers to be chemically toughened so as to increase their mechanical strength.

It may also be useful for the glass sheets to be chemically and/or thermally toughened so as to increase their mechanical strength.

According to another advantageous feature, the spacers are distributed nonrandomly over the fastening surface of the structure. This is because the inventors have shown that by optimizing the number and the position of the spacers it is possible to minimize the cost of the spacing function in the overall cost of such glazing, while ensuring sufficient mechanical strength.

A choice may be made between a homogeneous distribution or an inhomogeneous distribution of the spacers. The term "homogeneous" is understood to mean that the arrangement is symmetrical with respect to at least one of the mediatrices of the rectangular glazing.

A homogeneous distribution of the spacers is given by the formula $$d = f \times \left[ 6 - h + \left( \frac{1}{h} \right) \right] \times \sqrt{\frac{e}{4}},$$

where d is the distance between two spacers along a row parallel to the lower edge of the structure, e is the thickness in mm of the thinnest glass, h is the height of the structure and f is a safety factor, and by the total number n of spacers, given by $$n = \left[ \frac{h}{d} - 1 \right] \times \left[ \frac{c}{d} - 1 \right],$$

where c is the width of the structure.

An inhomogeneous distribution of the spacers is given by the formula $$d' = f \times \left[ 6 - g + \left( \frac{1}{g} \right) \right] \times \sqrt{\frac{e}{4}},$$

where d' is the distance between two spacers along a row parallel to the lower edge of the structure, for this specific row located at a height g with respect to the lower edge, e is the thickness of the thinnest glass, g is the height of the row with respect to the lower edge of the structure and f is a safety factor, and by the number n' of spacers for a row placed at a height g with respect to the lower edge of the structure, given by $$n' = \frac{c}{d'} - 1,$$

where c is the width of the structure.

According to one feature of these formulae, the height h of the structure is between 0 and 4 m. According to another feature, the safety factor f is between 1.3 and 2.3.

Thus, for a homogeneous arrangement, the spacers together may form, for example, two approximately trapezoidal geometries symmetrical with respect to the middle of the structure, the larger bases of which lie respectively toward the upper and lower ends of the structure when the latter is positioned vertically.

The substance contained between the two substrates may be liquid and/or solid, and most particularly contains no gaseous element. This is because it is imperative that no gaseous phase exists between the two substrates so as not to cause flow or deformation additional to that able to occur in the glazing.

Finally, the structure may be sealed for example by a double seal well known to those skilled in the art and composed of a butyl rubber bead or a silicone bead. Advantageously, it may instead be a triple seal and comprise a butyl rubber seal and a rigid acrylic bead, both inside the structure, and a silicone seal in contact with the outside of the glazing. This type of structure used as thermochromic glazing may be combined with at least one laminated glass pane and/or at least one insulating glass pane in order to constitute a glazing unit which is thus mechanically very stable.

The structure of the invention may be used in other types of glazing, such as in thermotropic, electrotropic or electrochromic glazing.

Further features and advantages of the invention will become more apparent on reading the description which follows, in conjunction with the appended drawings in which:

DETAILED DESCRIPTION OF THE INVENTION

Figure 1:
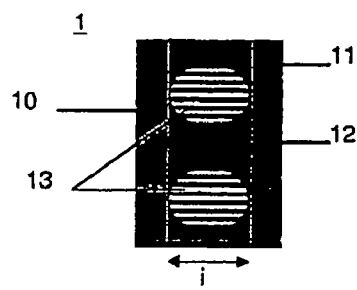
FIG. 1 is a partial sectional view of the glazing with spacers.

The thermochromic glazing 1 illustrated in FIG. 1 comprises at least two glass sheets 10 and 11 separated by a distance i, a substance 12 such as a polymeric solution filling the spaces separating the two glass sheets, together with spacers 13 which are placed between the two glass sheets and serve to keep the distance i constant when the glazing is positioned vertically, in case the glass sheets should deform.

The dimensions of such a glazing unit are, for example, a height of 2 m and a width of 80 cm, the glass sheets having a thickness which may be between 2 and 12 mm, preferably between 4 and 8 mm.

The polymeric solution 12 is a hydrogel consisting, for example, of 30% polyvinylcaprolactam (PVCL) and 70% water. It becomes opaque above a temperature of about 25-30° C., cutting off the wavelengths in the visible and in the infrared. The light transmission then switches from 80% to around 10-15%.

The thickness of the solution 12, which corresponds to the distance i separating the glass sheets, is between 0.1 and 3 mm, preferably about 2 mm, so as to obtain a sufficient difference in light transmission index $T_L$ between the unswitched state and the switched state.

Figure 2:
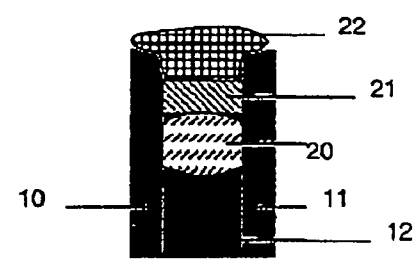
FIG. 2 is a partial sectional view of the edge of the glazing.

The tightness and the sealing around the periphery of the glazing, as illustrated in FIG. 2, are advantageously achieved by a triple seal 2 which comprises a butyl rubber seal 20 in contact with the solution 12, a rigid acrylic bead 21 placed around the seal 20, and a silicone seal 22 placed on top of the bead 21 and in contact with the outside of the glazing. As a variant, the rigid acrylic bead 21 and the butyl rubber seal 20 may be placed the other way round.

The butyl seal 20 seals against the water vapor inside the glazing and seals against gases external to the glazing which might dissolve in the polymeric solution. The butyl seal 20 is pliant and follows the deformations of the glazing.

Finally, the silicone seal 22 and the acrylic bead 21 seal against liquids or solvents. The silicone seal 22 ensures that the two glass sheets 10 and 11 are mechanically joined and held together.

Of course, any other known type of seal could be suitable.

When the glazing is positioned vertically, the solution 12 falls, creating a deformation gradient between the top and the bottom of the glazing; the two glass sheets have a tendency to come together at the top of the glazing and to move apart at the bottom of the glazing. The spacers 13 therefore allow the distance i separating the glass sheets to be kept approximately constant.

According to the invention, the spacers 13, which consist of added elements, are fastened to at least one of the glass sheets so as to maintain their position through the operating life of the glazing.

The spacers, made of glass, metal or other material, are fastened to at least one of the glass sheets by adhesion means which depend on the type of material used for the spacers. These adhesion means are, for example, an adhesive compatible with and resistant over time to the polymeric solution, or else an enamel. They may, for example, be acrylic adhesives sold under the brand name LOCTITE UV 3491, or else adhesives sold under the brand names CIBA 2011, and DEL 04302.

Figure 3:
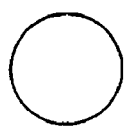
FIGS. 3 to 5 illustrate embodiments of spacers.
Figure 4:
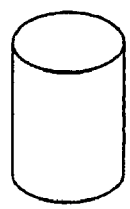
Figure 5:
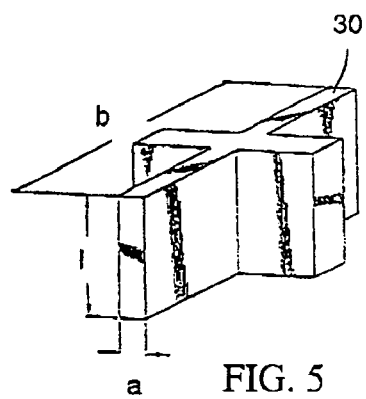

Various types and shapes of spacers, which are illustrated in FIGS. 3 to 5, may be envisioned. The material of the spacers must be chemical compatible with the polymeric solution 12.

For example, steel balls 2 mm in diameter, which must be suitably gaged to ±10 μm at most are suitable for meeting the mechanical strength of the glazing.

However, glass spacers will be preferred for the optical quality that they give the glazing. These glass spacers may be balls (FIG. 3) or cylinders (FIG. 4), or else they may have a cruciform shape (FIG. 5) or a shape like that given in application WO 99/56302, these shapes being especially sold under the brand name TAGLIA® by Saint-Gobain Display Glass.

Tests have been carried out on the use of glass balls 1 mm in diameter and 2 mm in diameter in 2 m×0.80 m glazing.

For glazing with dimensions of 2 m×0.80 m, glass balls 2 mm in diameter are in particular adopted.

With regard to the embodiment of glass cylinders, with a diameter of at least 1 mm, these have a buckling strength sufficient to withstand the stresses exerted by the glass sheets. These cylinders are adhesively bonded to the substrate 10 or 11 by one of their two bases.

As regards the cruciform spacers as illustrated in FIG. 5, they may be polished or used as sawn, their breaking load is high enough to resist the glass sheets perfectly. The dimensions are defined by the height l of 1.6 mm and the oblong rectangular surface 30 (of area a×b) where b equals 2.1 mm and a=0.2 mm. These spacers are adhesively bonded to either of the cruciform bases having the surface 30.

Other TAGLIA® spacers from application WO 99/56302 may be dimensioned so as to achieve a sufficient breaking load, which is itself given by the way in which the spacers are arranged and by the size of the glazing.

The table below summarizes the breaking load values which have been measured for various glass spacers stressed in a thermochromic glazing unit (2 m×0.80 m).

| SPACER TYPE | MAXIMUM BREAKING LOAD (N) |
| --- | --- |
| Glass ball (1 mm diameter) | 185 |
| Glass ball (2 mm diameter) | 657 |
| Polished cruciform spacer a = 0.2 mm; l = 1.6 mm; b = 2.1 mm | 885 |
| As-sawn cruciform spacer a = 0.2 mm; l = 1.6 mm; b = 2.1 mm | 696 |

Apart from their high breaking load, the cruciform spacers have the advantage over balls in that their bearing surface area is greater compared with that of the balls, thereby limiting the risk of the glass sheets being indented.

According to the invention, the geometrical arrangement of the spacers over the rectangular surface of a glazing unit may vary—it may be approximately rectangular, trapezoidal or even circular.

On the other hand, the spacers are distributed nonrandomly over the surface of the glass sheet. This is because the inventors have demonstrated that it is possible to envisage reducing the number of spacers for a glazing unit provided that they are arranged logically by calculating the stresses to which each spacer of each geometrical arrangement is subjected. Thus, it is even possible to reduce the stress experienced by the glazing, while maintaining good mechanical stability (no breakage of the glass panes or spacers) and reducing the number of spacers, and consequently to reduce the overall cost of the spacer function in the glazing.

Moreover, by increasing the thickness of the glass sheets it is also possible to reduce the number of spacers for the same level of deformation of the glass sheets, while not exceeding a breaking stress of the spacers.

Finally, a homogeneous or an inhomogeneous geometrical arrangement of the spacers may be preferred. The term "homogeneous" is understood to mean that the arrangement is symmetrical with respect to at least one of the mediatrices of the rectangular glazing.

For a homogeneous arrangement, the distribution logic according to the distance between the spacers and the total number of spacers depends on the height and the width of the glazing. The inventors have proposed a design solution:

the given distance d in cm between two spacers on a horizontal row is expressed as follows:

$$d = f \times \left[6 - h + \left(\frac{1}{h}\right)\right] \times \sqrt{\frac{e}{4}}$$

where e is the thickness in mm of the thinnest glass pane, h is the height in m between 0 and 4 m and f is a factor possibly varying between 1.5 and 2.3. f is a multiplying factor which will be called a safety factor—it gives a margin in the optimization of the distance between spacers and therefore in the total number of spacers in order to avoid the latter breaking. The lower the factor f, the lower the stress per spacer caused by the hydrostatic depression; and the total number n of spacers is thus expressed as:

$$n = \left[\frac{h}{d} - 1\right] \times \left[\frac{c}{d} - 1\right]$$

where h, the height of the glazing, c, the width of the glazing and d, the spacing calculated previously, are in meters. For the calculation, it is firstly necessary to calculate each of the two mathematical expressions and to round them down to the nearest integer before multiplying them in order to give the integer n.

For an inhomogeneous arrangement, that is to say without any symmetry, the distribution logic for the distance between spacers and the number of spacers are functions of the height of the row on which the spacers are positioned with respect to the bottom of the glazing. The inventors have proposed the following design solution:

$$d' = f \times \left[6 - g + \left(\frac{1}{g}\right)\right] \times \sqrt{\frac{e}{4}}$$

where d' is the distance in cm between two spacers on a horizontal row for this precise row located at a height g with respect to the bottom of the glazing, which is expressed in m and is between 0 and 4 m, e is the thickness in mm of the thinnest glass sheet and f is the safety factor, possibly varying between 1.3 and 2.3; and the number n of spacers for a row placed at a height g with respect to the bottom of the glazing is thus expressed as:

$$n' = \frac{c}{d'} - 1$$

where c is the width of the glazing in m and d' is the distance between spacers, calculated above and expressed in m in the equation, the expression c/d' being rounded down to the nearest integer before carrying out the subtraction operation.

As an example, the values given below are consistent with the formula for a homogeneous arrangement. Explained below is a comparison between two different distributions of identical spacers for glazing having dimensions of 2 m×0.80 m with glass sheets having a thickness of 4 mm.

For the first distribution, in which the safety factor is set at 2.3, the total number of spacers n is 144 distributed with uniform and identical spacings d of 10.4 cm over the height and over the width in 18 rows with 8 spacers per row.

Figure 6:
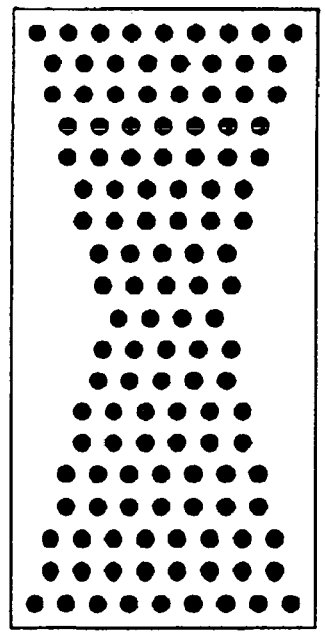
FIG. 6 illustrates a homogeneous arrangement of the spacers in the glazing.

For the second distribution, the total number is 126 spacers distributed with uniform and identical spacings over the height and over the width in 19 rows but with a number gradient according to the height. The arrangement may be likened to two structures of approximately trapezoidal shape which are symmetrical with respect to the mid-height of the glazing, as may be seen in FIG. 6, with a larger number of spacers on the upper and lower bases or rows (for example 9) than on the central base or row (for example 4).

The comparative results given in the table below are on the load to which a spacer is subjected and the stress to which an outer face of the glazing is subjected.

|  | LOAD (N) | STRESS (MPa) |
|---|---|---|
| First, so-called rectangular, homogeneous distribution | 165 | 12 |
| Second, so-called trapezoidal, homogeneous distribution | 130 | 9 |

It may be seen that the arrangement of the spacers according to the logic of the second, so-called trapezoidal, distribution advantageously makes it possible, while reducing the number of spacers, to reduce the load to which each spacer is subjected (20% reduction) and also to decrease the stress to which the glazing may be subjected (25% reduction).

Figure 7:
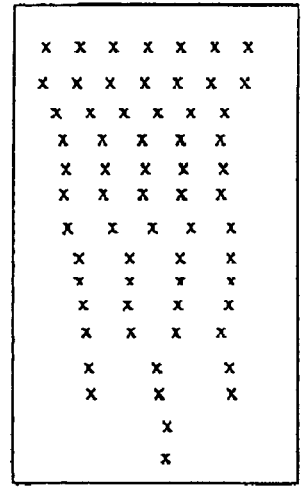
FIG. 7 illustrates schematically an inhomogeneous arrangement of the spacers in the glazing.

The number of spacers could be further decreased in an inhomogeneous but logical distribution which would make the load per spacer tend toward 165 N and the stress on the glazing 12 MPa, which values remain in any case safe values with regard to the mechanical strength of the glazing. The schematic FIG. 7 illustrates an example of an inhomogeneous arrangement for glazing of the same dimensions as those of the glazing of the homogeneous arrangement given as an example above, namely 2 m in height and 0.80 m in width. For a safety factor f of 2.1, 71 spacers are needed, the distance between the spacers being different according to the height of the row.

This inhomogeneous arrangement requires fewer (71) spacers with a higher safety factor (f=2.1) than in the case of the homogeneous arrangement (144 spacers and f=2.3). Nevertheless, unlike the homogeneous arrangement for which the glazing may be placed vertical in either sense, it is imperative, in the case of the inhomogeneous arrangement, to ensure that when the glazing is positioned vertically a concentrated region of spacers is placed toward the top of the glazing.

An example of a process for manufacturing the glazing is as follows.

Points are drawn on a first glass sheet, which points will be removed after the glazing has been manufactured and correspond, on the opposite face of the glass sheet, to the positions of the spacers 13 imposed according to a chosen distribution.

The butyl first seal 20 is deposited around the periphery on the face intended to receive the spacers. Then, after a spot of adhesive has been deposited on the spacers, the latter are adhesively bonded to the glass sheet at the selected positions. A UV lamp is used to crosslink the adhesive so as to completely fix the spacers.

The second seal, namely the acrylic bead 21, is deposited around the periphery of the glass sheet and over the first seal 20.

The layer of the polymeric solution 12 is then spread out inside the volume bounded by the first seal 20.

The second glass sheet is then pressed onto the first sheet, four inserts, for example made of foam, having been placed between the two glass sheets in order to keep them separated by an amount greater than the spacers, since the solution 12 must not come into contact with the second sheet.

Finally, the combination of the two glass sheets is put into a chamber in which a vacuum is created and the two glass sheets made to come closer together, compressing the inserts. On leaving this chamber, the glass sheets are definitively sealed and finally made leaktight by applying the silicone seal 22 around the edge of the glazing.

In a manufacturing alternative, the silicone seal may be omitted and the sealing may be obtained by binding together the edges of the glass sheets.

Moreover, the first two seals 20 and 21 applied in this method of implementing the process before the polymeric solution 12 has been deposited may be put into position at any other time after the glass has been cut and before the glazing has been sealed.

The glazing structure described above has been described in the case of its use for thermochromic glazing.

Of course, it applies to any product which may include, between two glass substrates, a liquid or viscous substance and may include solid particles. For example, mention may be made of solar collectors, liquid cells forming a sun screen, liquid-crystal glazing consisting of a gel based on liquid crystals, electrochromic or photochromic glazing comprising a gel or liquid capable of flowing, or viologen-type glazing or else electrotropic glazing.

The invention claimed is:

1. A glazing comprising:
   (i) a first glass sheet having a first surface and a second glass sheet having a second surface, wherein the first surface and the second surface face each other;
   (ii) spacers between the first glass sheet and a second glass sheet to separate the first surface of the first glass sheet and the second surface of the second glass sheet by a distance to provide a space wherein the space contains substantially no gas; and
   (iii) a liquid or solid containing substance containing substantially no gases at least partially filling the space;
   wherein the spacers are fastened to at least one of the first glass sheet or the second glass sheet;
   wherein the glazing has an upper edge, a lower edge, a first side edge, a second side edge, a width c, a height h, and a midline parallel to the lower edge and midway between the upper edge and the lower edge,
   wherein the spacers are non-randomly distributed on the first surface or the second surface without forming a peripheral rectangular shape, and
   wherein n spacers are distributed on the first surface or the second surface in a parallelepipedal shape in a homogenous distribution, wherein $$n = [h/d-1] \times [c/d-1]$$

and d is $$d = f \times [6-h=(1/h)] \times \sqrt{e}/4$$

wherein d is the distance between two spacers along a row parallel to a lower edge of the glazing, e is the thickness of the thinnest glass sheet, h is the height of the glazing, and f is the safety factor.

2. The glazing of claim 1, wherein the substance comprises a polymeric solution.

3. The glazing of claim 1, wherein the spacers are fastened to the first glass sheet or the second glass sheet by adhesive bonding.

4. The glazing of claim 3, wherein the spacers are fastened with an adhesive or an enamel.

5. The glazing of claim 1, wherein the spacers are steel balls.

6. The glazing of claim 1, wherein the spacers are made of glass.

7. The glazing of claim 1, wherein the spacers have the shape of a ball or a cylinder.

8. The glazing of claim 1, wherein the spacers have the shape of a cruciform.

9. The glazing of claim 1, wherein h ranges from 0 to 4 m.

10. The glazing of claim 1, wherein f ranges from 1.3 to 2.3.

11. The glazing of claim 1, wherein the spacers are distributed on the first surface or the second surface in the shape of a first trapezoidal geometry and a second trapezoidal geometry, wherein the first trapezoidal geometry and the second trapezoidal geometry are distributed symmetrical with respect to a midline of the glazing, the first trapezoidal geometry is above the midline of the glazing and the widest part of the first trapezoidal geometry is closest to the upper edge, and the second trapezoidal geometry is below the midline of the glazing and the widest part of the second trapezoidal geometry is closest to the lower edge.

12. The glazing of claim 1, further comprising a seal around the upper edge, first side edge, lower edge, and second side edge, wherein the seal comprises a butyl rubber seal between the first face and the second face, a rigid acrylic bead, and a silicon seal.

13. The glazing of claim 1, wherein the glazing is a thermochromic glazing.

14. The glazing of claim 13, further comprising at least one laminated glass pane or at least one insulating glass pane.

15. A glazing comprising:
(i) a first glass sheet having a first surface and a second glass sheet having a second surface, wherein the first surface and the second surface face each other;
(ii) spacers between the first glass sheet and a second glass sheet to separate the first surface of the first glass sheet and the second surface of the second glass sheet by a distance to provide a space wherein the space contains substantially no gas; and
(iii) a liquid or solid containing substance containing substantially no gases at least partially filling the space;
wherein the spacers are fastened to at least one of the first glass sheet or the second glass sheet;
wherein the glazing has an upper edge, a lower edge, a first side edge, a second side edge, a width c, a height h, and a midline parallel to the lower edge and midway between the upper edge and the lower edge,
wherein the spacers are non-randomly distributed on the first surface or the second surface without forming a peripheral rectangular shape, and
wherein n spacers are distributed on the first surface or the second surface in a parallelepipedal shape in an inhomogenous distribution, wherein $n = c/d - 1$ wherein d is $d = f \times [6 - g + (1/g)] \times \sqrt{e/4}$ wherein d is the distance between two spacers along a row parallel to a lower edge of the glazing at a height g above a bottom edge of the glazing, e is the thickness of the thinnest glass sheet, and f is the safety factor.

16. The glazing of claim 15, wherein h ranges from 0 to 4 m.

17. The glazing of claim 15, wherein f ranges from 1.3 to 2.3.

18. The glazing of claim 15, wherein the substance comprises a polymeric solution.

19. The glazing of claim 15, wherein the spacers are fastened to the first glass sheet or the second glass sheet by adhesive bonding.

20. The glazing of claim 19, wherein the spacers are fastened with an adhesive or an enamel.

21. The glazing of claim 15, wherein the spacers are steel balls.

22. The glazing of claim 15, wherein the spacers are made of glass.

23. The glazing of claim 15, wherein the spacers have the shape of a ball or a cylinder.

24. The glazing of claim 15, wherein the spacers have the shape of a cruciform.

25. The glazing of claim 15, wherein the glazing is a thermochromic glazing.

26. The glazing of claim 25, further comprising at least one laminated glass pane or at least one insulating glass pane.

* * * * *